UNITED STATES PATENT OFFICE.

ALVIN M. RICHARDSON, OF NEW YORK, N. Y.

MANUFACTURE OF ARTIFICIAL MARBLE OR STONE.

SPECIFICATION forming part of Letters Patent No. 233,948, dated November 2, 1880.

Application filed July 22, 1880. (No model.)

*To all whom it may concern:*

Be it known that I, ALVIN M. RICHARDSON, a citizen of the United States, residing at New York, in the county and State of New York, have invented an Improvement in the Manufacture of Artificial Marble and Stone; and I hereby declare the following to be a full, clear, and exact description thereof.

This invention relates to the production of a very beautiful and cheap artificial marble and stone which shall possess great strength, hardness, and durability; and my invention consists in a composition formed of certain ingredients combined and chemically treated in such a manner as to produce thorough crystallization and carbonization, the substance thus produced being capable of resisting the action of fire, frost, and water, thus specially adapting it for use as a building material in any climate, and for a great variety of other purposes, as will be hereinafter set forth.

In carrying my invention into effect I proceed by taking a suitable vessel and placing therein one hundred gallons of water, (soft water preferred,) five pounds of sulphate of lime, one pound sulphate of potash, one quart of solution of copperas, two pounds of nitrate of soda, one quart silicate of soda, two pounds arrow-root, and one quart of a natural liquid paint found in the mountains of Wales and commercially known as "petrified liquid," or three pounds of pulverized feldspar and quartz. The whole is then thoroughly incorporated together, and after the solid ingredients have been dissolved two gallons of sour or butter milk are added to the mixture.

In producing the surface of my imitation of marble I take any desired quantity of the solution above mentioned and mix therewith calcined plaster, or, preferably, Keene's cement, until the mass is of the consistency of paste, which substance is then placed in suitable molds to give any desired shape, and at the same time, by a simple well-known process, different pigments are manipulated so as to produce veins, lines, &c., and in this manner I am enabled to successfully imitate any known foreign or American marble, as well as produce an infinite variety of unique and elegant designs of inlaid work at a nominal cost. The surface being thus formed or laid, I then mix a quantity of the above-named solution with Keene's common cement or calcined plaster and marble-dust or fine sand until it is of the consistency of thick paste, and then fill the remaining space in the mold with this material, which will adhere tenaciously to the composition first placed therein.

The compound when dry becomes extremely hard, and is susceptible of a very high polish, and in many particulars is decidedly preferable to the real or natural marble, as it is not affected by smoke or greasy substances, and is specially adapted for mantel-pieces, monuments, slabs, furniture-tops, marbleizing old brick and other buildings, wainscoting, altars, columns, tiling, &c.

In manufacturing artificial stone or building material for fronts of buildings, trimmings, abutments, foundations, cemetery-work, walks, &c., I take seven parts of clear sharp sand or gravel and add thereto one part (more or less) of lime or cement, (Portland preferred,) and with each barrel of lime or cement I mix, when dry, two pounds of plumbago. An additional quantity of plumbago may be used advantageously for abutments or any heavy work which is to be exposed to the weather and water. These ingredients are then thoroughly mixed together and dampened with the solution first described to the proper consistency, after which the mixture is tamped or pressed into molds of any desired form or shape, and after being removed therefrom is kept damp for about four days, when it is ready for use.

When this material is to be used for cellars or plastering of floors and walls it is dampened, so that it can be readily applied with a trowel, and when dry becomes extremely hard and durable.

To manufacture emery-wheels or emery-stones I add to each ten pounds of emery-flour five pounds of Stourbridge loam, and then mix the same with the solution first described to the consistency of a thick paste, which is then thoroughly pressed in metallic molds, and after it becomes dry is burned or baked in a muffle at a temperature a little below white heat.

A suitable material for the production of the marble may be had by burning common gypsum, and after the burning is completed it is properly sorted and ground to a powder and soaked in a solution of alum, and is then baked and reground.

The union or catalysis of the minute atoms or particles forming the marble or stone under my process becomes much stronger and firmer as the material so manufactured becomes exposed to the weather and water, and throws off carbonic-acid gas.

What I claim as my invention, and desire to secure by Letters Patent, is—

1. An artificial marble or stone composed of Keene's cement or calcined plaster and marble-dust, or of sand or gravel and cement and plumbago united and solidified by mixing therewith a chemical solution formed of water, sulphate of lime, sulphate of potash, solution of copperas, nitrate of soda, silicate of soda, arrow-root, petrified liquid, or pulverized feldspar and quartz, and sour or butter milk, substantially as and for the purpose set forth.

2. The herein-described liquid compound, consisting of water, sulphate of lime, sulphate of potash, solution of copperas, nitrate of soda, silicate of soda, arrow-root, petrified liquid, or pulverized feldspar and quartz, and sour or butter milk, substantially in the proportions named, for the purpose of producing the crystallization and carbonization of the artificial marble or stone, as described.

Witness my hand this 17th day of July, A. D. 1880.

ALVIN M. RICHARDSON.

In presence of—
W. C. KIMBALL,
JACOB DU BOIS.